United States Patent [19]

Mabie

[11] Patent Number: 5,017,182
[45] Date of Patent: May 21, 1991

[54] BELT CONNECTOR WITH IMPROVED FLEXIBLE BITE FEATURE

[75] Inventor: Norman H. Mabie, Claremont, N.H.

[73] Assignee: L.M. & L. Corporation, Claremont, N.H.

[21] Appl. No.: 443,731

[22] Filed: Nov. 30, 1989

[51] Int. Cl.⁵ .............................................. F16G 7/00
[52] U.S. Cl. .................................... 474/256; 474/255; 474/272; 285/21; 285/239; 403/294; 403/298; 411/902; 411/907
[58] Field of Search ..................... 24/31 B, 31 C, 453, 24/35, 36, 31 R; 29/459; 285/239; 411/545, 900, 929.2, 902–907; 428/57, 58, 582, 583; 474/253–256; 403/334, 259, 292, 294–298

[56] References Cited

U.S. PATENT DOCUMENTS

| | | | |
|---|---|---|---|
| 2,716,275 | 8/1955 | Matthysse | 29/459 |
| 3,605,201 | 3/1968 | Peterson | 474/256 |
| 3,922,759 | 12/1975 | Mabie | 24/31 B |
| 3,989,280 | 11/1976 | Schwarz | 285/21 |
| 4,011,785 | 3/1977 | Schrepferman | 411/545 |
| 4,336,021 | 6/1982 | Haines | 474/256 |

Primary Examiner—Ramon S. Britts
Assistant Examiner—Roger J. Schoeppel
Attorney, Agent, or Firm—Pearson & Pearson

[57] ABSTRACT

An endless belt formed by a connector and a finite length of hollow tubing or solid tubing with recesses at each end. The connector is characterized by a biting edge that has a larger diameter than the inside diameter of the tubing. It is readily flexible away from the direction of insertion of the edge of the tube. The biting edge is formed as a feathered or an erose outlying portion of the base at each of two gripping heads. Once the gripping heads are inserted tension on the tubing causes the feathered edges and adjacent portions of the gripping head to bite into the internal wall of the tubing and form an improved grip therewith.

12 Claims, 2 Drawing Sheets

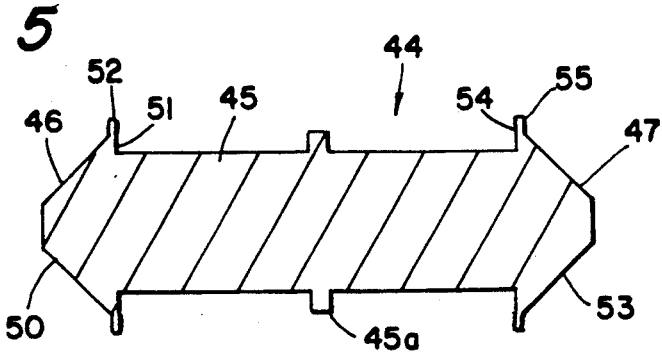
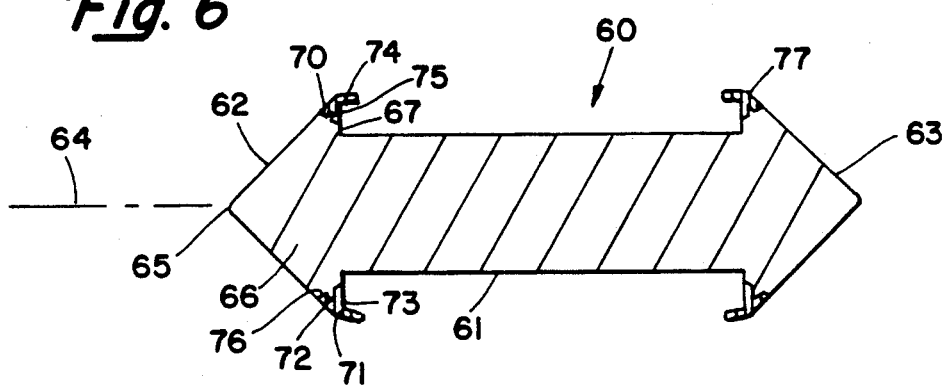
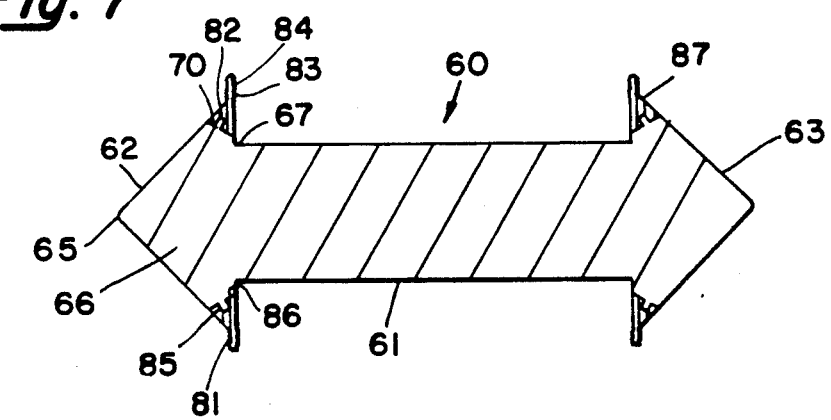
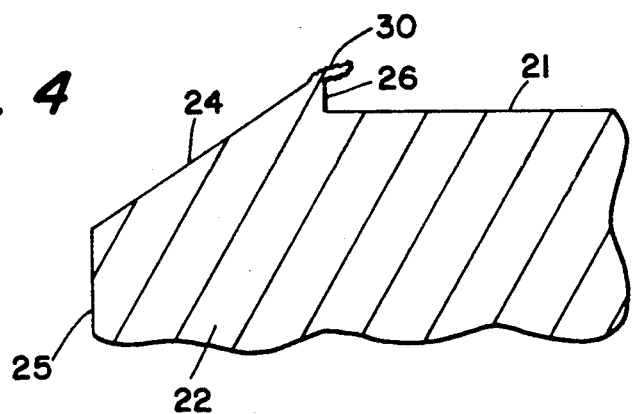

BELT CONNECTOR WITH IMPROVED FLEXIBLE BITE FEATURE

BACKGROUND OF THE INVENTION

1. Field of the Invention

This invention generally relates to power transmission means and, more particularly, to a novel endless belt assembly having a connector with improved holding capabilities.

2. Description of Related Art

The advent of extruded lengths of polymeric materials has been accompanied by efforts to adapt to such materials to endless belt applications. A number of fastening means were available for the purpose of connecting two free ends of other types of belting together to form a continuous length. Such methods, however, left much to be desired when applied to tubing. Specifically these fastening means normally required special equipment and techniques that were difficult to apply on equipment where there was little room to work and where the belt had to be formed in situ.

U. S. Pat. Nos. 3,461,733 and 3,501,971 disclose major improvements in such connectors for endless belt applications using polymeric tubing. The former patent discloses a novel connector in combination with a tough elastomer belt. The connector comprises a central shank or shaft and outwardly facing gripping heads extending from the end of the shaft. Each gripping head has a conoidal or pyramidal shape. The latter patent discloses improvements in such connectors that include a belt-seizing rib for improving the bite between the connector and the tubing. In general the inventions disclosed in those patents have been highly successful.

Yet the experience gained with extended use of such connectors has identified some limitations. First, an upper load limit exists for a given tubing material. This load limit lies below the tension requirements for a number of applications. Secondly, a number of new materials could be applied to endless belt construction. However, these connectors have not worked successfully with such materials. Thus, potential applications for endless belts exist that the prior inventions have not been able to satisfy.

U.S. Pat. No. 3,922,759 discloses two embodiments of a connector comprising a gripping member which is easily flexed away from the direction of entry into tubing to facilitate such entry. In one embodiment the gripping member is molded; in another, the connector comprises discrete pieces. The molded coupling insert comprises gripping heads integrally formed at the extremes of a central cylindrical body. The gripping heads comprise fluted gripping rings or integral annular flanges. One of the flanges is flexible with respect to the axis of the central cylinder body. The ring is also tapered to facilitate insertion of the connector into a belt. After insertion, when tension is applied to the belt assembly, the biting ring formed by such a flange flexes outwardly or forwardly until it intercepts an outer stop ring and bites into the belt. In the alternate construction, a internally threaded cylinder body receives machine screws and flex washers. The flex washers are radially divided to form flexible segments that flex toward the direction of the cylinder when the connector is being inserted into the tube and flex outward into a biting engagement with the tubing material when tension is applied.

This approach achieved its objectives of improving load characteristics and ease of insertion. However, it was found that the increased holding power realized with these connectors did not justify associated increased manufacturing costs. As a result, connectors, such as shown in U.S. Pat. Nos. 3,461,733 and 3,501,971, have continued to be the connectors of choice for endless belt applications. This acceptance continues despite the load limit and material limitations that foreclose a number of applications for endless belts formed of polymeric tubing.

SUMMARY OF THE INVENTION

Therefore it is an object of this invention to provide an improved power transmission means in the form of an endless belt capable of a wider range of applications than available with prior art connectors.

It is another object of this invention to provide an improved transmission means in which a connector provides an improved bite into tubing material for endless belts.

Yet still another object of this invention is to provide an improved transmission means with a easily connected endless belt and connector construction that is adapted for a wide range of endless belt materials.

In accordance with this invention, an endless belt assembly comprises hollow tubing or solid tubing with cylindrical recesses at the ends thereof and a connector. The connector, constructed in accordance with another aspect of this invention, includes an elongated central body having a given transverse dimension and gripping head means at either end thereof with a base portion having a transverse dimension that exceeds a corresponding transverse dimension of the belt recess. Flexible, outlying erose, or rough feathered, sections extend from the periphery of the base portion. These outlying erose, or rough feathered, flexible edge portions deform toward the central body as the connector is inserted into the tubing. They move radially outwardly when tension is applied to the belt thereby to bite into the tubing and to enable adjacent portions of the gripping heads to bite into the belt with greater holding power.

BRIEF DESCRIPTION OF THE DRAWINGS

This invention is pointed out with particularity in the appended claims. The various objects, advantages and novel features of this invention will be more fully apparent from a reading of the following detailed description in conjunction with the accompanying drawings in which like reference numerals refer to like parts and in which:

FIG. 4 is an enlarged cross-sectional view of a portion of a gripping head as disclosed in FIGS. 2 and 3;

FIG. 5 is a cross-section of a connector of an alternative construction;

FIG. 6 is a cross-section of a two-piece connector constructed in accordance with this invention;

FIG. 7 is a cross-section of an alternate form of a two-piece connector constructed in accordance with this invention.

DESCRIPTION OF ILLUSTRATIVE EMBODIMENTS

Figure 1:
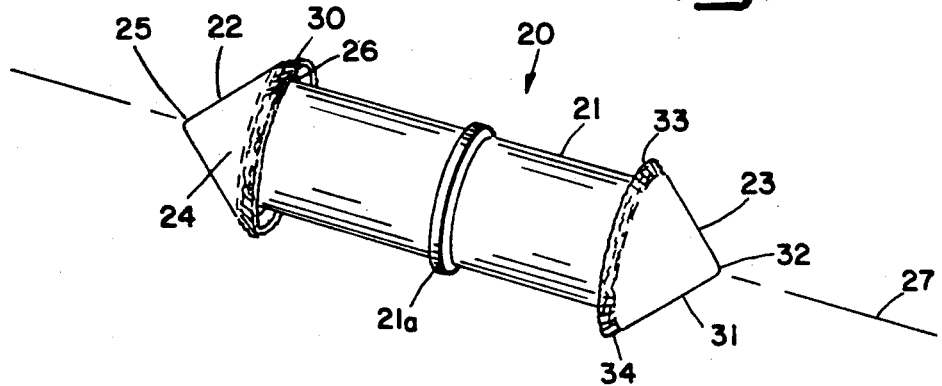
FIG. 1 is a perspective view of a connector constructed in accordance with one aspect of this invention.

FIG. 1 discloses one embodiment of a connector 20 constructed in accordance with this invention. The connector 20 is an integral element that includes a central cylindrical body portion or body 21 and an optional centering ring 21a. Gripping heads or gripping head portions 22 and 23 extend from the ends of the central cylindrical body 21. The gripping heads 22 and 23 are generally formed with some conoidal or pyramidal shape. Conoidal shapes are particularly adapted for facilitating the insertion of the connector into a belt and for easy manufacturing In one embodiment, a right angle cone as shown in FIG. 1 is selected; a frusto-conical cross-section can also be selected, as shown in other Figures. Still referring to FIG. 1, the connector 20 is formed of metal; and the specifically disclosed gripping head 22 includes a conical surface 24 that constitutes a tapered surface that extends from an apex 25 and terminates in a radial extending surface 26 that is transverse to an axis 27 through the cylindrical central member 21. The radial surface 26 constitutes a base planar surface for the gripping head 22. Thus, the gripping head 22 is rigid and is bounded by a tapered surface and a base planar surface that extend outwardly toward an intersection.

Metal connectors, such as connector 20, normally are manufactured on a screw machine. As known screw machines form finished products through a series of cutting or shaping operations. In accordance with the embodiment of this invention shown in FIG. 1, the screw machine forms the radially extending base 26 by drawing a cutting tool along a line transversely to the axis 27. Then a cut is made along an oblique line from the axis 25 toward central body 21 that corresponds to the conical surface,; 22. When the cutting tool is proximate with end surface 26 (i.e., at the intersection of the two surfaces), it is drawn radially outwardly leaving a roughened feathered edge, or burr, 30 about the periphery of the radially extending base 26 as shown in FIGS. 1 and, in enlarged scale, in FIG. 4. With this particular sequence the feathered edge 30 extends a few mils (e.g., up to 7 mils) toward the center 20 and is outlying of the radially extending base 26. Moreover, as the tool withdraws, it produces a feathered edge 30 with an erose or roughened surface because the feathered edge 30 is thin and flexible and not rigid.

In accordance with an alternative manufacturing process, a piece of stock is initially machined to produce the cylindrical body 21 and central ring 21a leaving cylindrical end portions. A gripping head 22 is then formed by advancing a cutting tool along a line perpendicular to the axis 27. The tool has a cutting surface that is inclined at the finished angle of the conical surface 24. When the tool is positioned essentially coextensively with the gripping head and advanced; rapidly, it produces the desired rough feathered edge or burr 30 that extends continuously around the periphery of the gripping head 22.

The gripping head 23 has the same configuration. More specifically, a conical surface 31 extends between, an apex 32 at the axis 27 and a radially extending base surface 33 that is referenced in FIG. 1. It is shown only in FIGS. 2 and 3 due to the perspective view of FIG. 1. After the radially extending base surface 33 is formed on the screw machine, a shaping operation forms the conical surface 31 and terminates proximate the base 33 to produce a roughened feathered edge 34 having a length of a few mils that also extends toward the center of the connector 20 and that constitutes an outlying roughened feathered extension of the base surface 33 that is at the intersection of the tapered and base planar surfaces.

Figure 2:
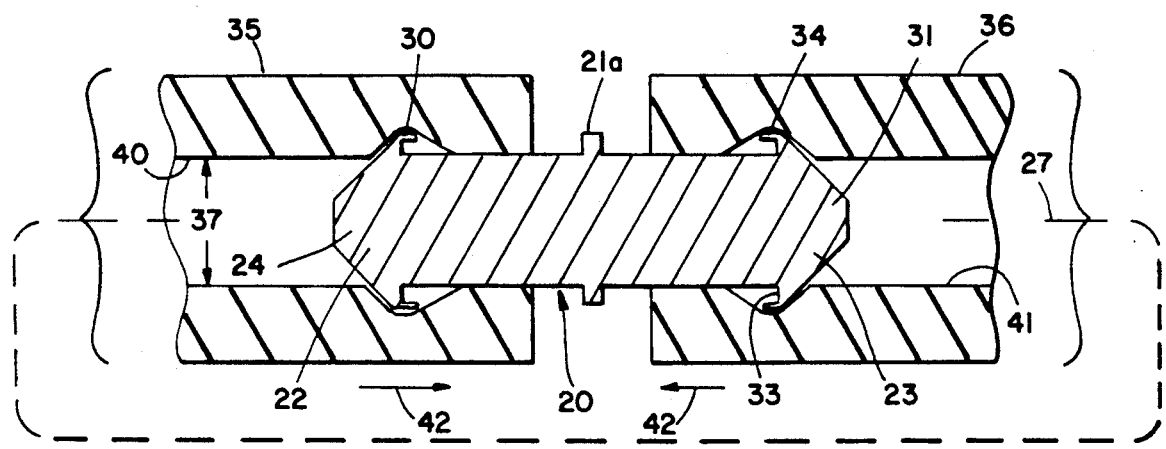
FIG. 2 is a partial cross-sectional view of an endless belt assembly including a section of a hollow endless belt positioned during the insertion of the connector shown in FIG. 1.

FIG. 2 is a cross-section of portions of a flexible endless belt of a resilient material depicting the configuration of the feathered edges 30 and 34 when a connector 20 is being inserted into end portions 35 and 36 of the endless belt. In this FIG. 2 the gripping heads 22 and 23 have a frusto-conical shape. A dashed line from the outer edges of the end portions 35 and 36 represents the remainder of a length of tubing. The tubing, as known, may comprise solid material with recessed ends or may comprise a piece of hollow tubing. Typically the endless belt will comprise any of a range of resilient polymeric materials such as a Hytrel ® urethane product sold be E. I. DuPont de Nemeurs & Company and other urethane products.

The nominal diameter of the gripping heads 22 and 23 exceed the inner diameter 37 of the tubing. As the connector 20 moves into the tube end 35, the gripping head 22 eventually engages the inner surface 40 of the tube end 35. With further insertion the inner surface 40 stretches and slides over the conical surface 24 and deflects the feathered edge 30 toward the axis 27. Similarly, the gripping head 23 eventually engages an inner surface 41 of the tube and the feathered edge 34 moves toward the axis 27. In FIG. 2 this relative motion is represented by arrows 42 that depict motion of the tube ends 35 and 36 relative to the connector 20.

Figure 3:
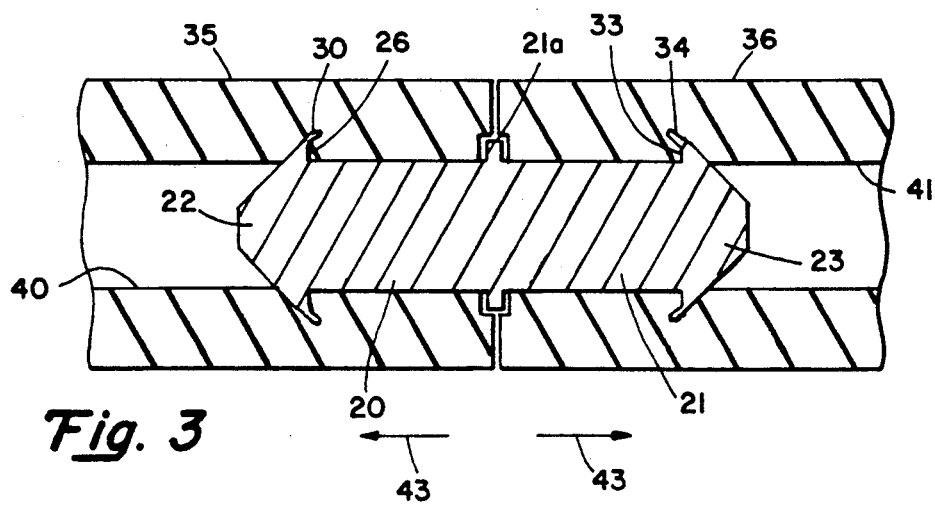
FIG. 3 is a cross-sectional view of a section of an endless belt assembly constructed in accordance with this invention while the end portions of the endless belt are in tension after insertion on the connector.

When an endless belt formed as shown in FIG. 2 is positioned on a machine, the endless belt will be in tension. There is a tendency of the tube ends 35 and 36 to move away from each other and over the connector 20 as represented by arrows 43 in FIG. 3. As the tube end 35 tends to move to the left, as shown in FIG. 3, the inner surface 40 engages the feathered edge 30 and tends to bend the feathered edge 30 radially outward about a point at the intersection of the conical surface of the gripping head 22 and the radially extending planar base 26. However, the feathered edge 30 begins immediately to bite into the material of the tube end 35 forcing a small portion of the material that is coextensive with the centrally elongated member 21 to close down on the radial surface 26 and engage the base 26. This provides an improved bite between the gripping head 22 and the tube end 35. Likewise, the tension on the tube end 36 in the direction of the arrow 43 causes the feathered edge 34 to bite into the tube end 36. Material adjacent the feathered edge 34 engages the centrally elongated member 21 and moves into contact with the base 33. As a result, the gripping heads 22 and 23 better engage the ends 35 and 36 of the tubing.

For a given tubing material connectors 20 constructed in accordance with FIGS. 1 through 3 have exhibited up to 50% more holding power over prior art connectors, apparently because the feathered edges or erose outlying portions 30 and 34 enable the gripping heads 22 and 23 to bite into the surfaces of the ends 35 and 36 more readily. Moreover, the feathered edges or erose outlying portions 30 and 34 enable the connectors 20 to be used over a wider range of materials. Prior art connectors have been limited to materials having durometer measurements of 50 to 85 on the Shore A scale; it has been found that this connector structure enables operations with endless belt materials having durometer ranges of 50 to 95 on the Shore A scale and 45 to 70 on the Shore D scale. This increased capability enables harder (i.e., less flexible) tubing to be incorporated in endless belts, thus broadening the range of applications for endless belts.

FIG. 5 discloses an alternative connector construction in which a connector 44 includes a central elongated body 45 with an optional centering ring 45a. Frusto-conical gripping heads 46 and 47 extend from the central elongated member 45. The connector 44, however, is constructed by shaping a conical surface 50 and then forming a radially extending surface or base 51 for the frusto-conical section. In this construction, the cutting tool is drawn radially outward along a line in the plane of the base 51 until the tool is proximate the intersection of the conical surface 50 with the plane of the base 51. Then the tool is withdrawn axially to form a feathered edge 52 that constitutes an erose outlying section that extends essentially radially from a central axis of the connector 44. Likewise, a conical surface 53 on the gripping head 47 is formed first. Then the screw machine equipment forms a radial surface 54 by drawing the cutting tool radially to a position proximate the intersection of the base 54 and conical surface 53. Axially withdrawing the cutting tool produces a feathered edge 55 that has the same essential characteristics as the feathered edge 52.

As another alternative, a piece of stock is initially machined to produce the cylindrical body 45 and central ring 45a such as shown in FIG. 5, leaving cylindrical end portions. A gripping head is formed by first forming an over-sized outline of the gripping head. Then a cutting tool moves parallel to the longitudinal axis with a cutting edge parallel to the conical surface. The cutting tool stops when the appropriate dimension is reached. This leaves a burr or feathered edge, such as the feathered edges 52 and 55.

Either embodiment can be used in many applications requiring a single metallic connector. It has been found that connectors can be composed of stainless steel, titanium, aluminum, bronze steel or other non-ductile machinable metals. It also is possible to adapt the connector shown in FIGS. 1 through 5 for applications in which non-metallic connectors are more appropriate because the environment may deteriorate metal exposed between the ends of the tubing. FIGS. 6 and 7 disclose a construction that utilizes a metallic ring in conjunction with a molded insert. Typical molding materials include Delrin, Nylon and other known moldable plastics.

Referring first to FIG. 6, a connector unit 60 comprises a molded central elongated member 61 and gripping heads 62 and 63 extending oppositely along an axis 64. The gripping heads 62 and 63 are formed as right cones in FIGS. 6 and 7. The gripping head 62, by example, includes an apex 65 on the axis 64 and a conical surface 66 extending therefrom and terminating at a radial surface or base 67. A chamfered surface 70 about the periphery of the base interconnects the conical surface 66 and radial base 67. This chamfered surface 70 supports an angular ring 71.

More specifically the annular ring 71 is machined from metal, such as titanium, stainless steel, bronze, steel or other non-ductile material. As shown in FIG. 6 the annular ring 71 includes a frusto-conical surface 72 that is an extension of the conical surface 66 and a radial surface 73 that is an extension of the radial surface 67. The annular ring 70 is machined in the same manner as the gripping head 22 shown in FIG. 1. Thus, in this particular embodiment a feathered edge 74 extends from the bases 67 and 73 to from an outlying erose section about the periphery of the surface or base 73. Typically machining operations form the ring 71 with its feathered edge 74. A key, in a form of a V-shaped notch 75 machined in a chamfered surface 76 of the ring 71, locks the ring 71 into the molded gripping head 62. A similar ring 77 is molded onto the gripping head 63.

FIG. 7 discloses an alternative embodiment with a molded connector 60 having a centrally elongated member 61 and gripping heads 62 and 63. The gripping head 62 extends from an apex 65 and terminates at an extension of a radial surface 67 forming a conical surface 66. A chamfered surface 70 extends between the conical surface 65 and the radial surface 67. These elements are analogous to like numbered elements in FIG. 6.

In this particular embodiment, a metallic annular ring 81 has a conical surface 82 that is an extension of the conical surface 66 and a radial surface 83 that is an extension of the radial surface 67. If the surface 82 is formed before the surface 83 using steps analogous to those used with the connector 44 shown in FIG. 5, the ring 81 has a radially extending feathered edge 84 as an outlying erose section. In this particular embodiment a square notch 85 is in a chamfered surface 86 serves as an alternative key configuration. During manufacture a ring 81 and a corresponding ring 87 are positioned in a mold. The remainder of the connector is then molded, with molding material being forced into the keys represented by the square notch 85.

FIGS. 6 and 7 therefore disclose three-piece connectors formed of diverse materials with a moldable material forming the main portion of the connector 60 and rings 71 and 77 and rings 81 and 87 constituting gripping rings of a metallic material molded onto the ends locked onto the periphery of the gripping heads. The rings form erose outlying sections from the base that bite into the interior surfaces of a belt material. As they are remote from the ends of the tubing and bite into the tubing, they are protected from hostile environments A comparison of the connectors shown in FIGS. 6 and 7 and the one-piece connectors shown in FIGS. 1 through 5 illustrates that the cross sections for gripping purposes are identical in both approaches.

The foregoing disclosure depicts several embodiments of a connector for joining the recessed ends of a belt to form an endless belt. Each embodiment includes an integral connector that comprises an elongated central body portion, such as the central bodies 21, 45 and 61. Gripping head portions 22 and 23, 46 and 47, and 62 and 63 have a base portion with a transverse dimension exceeding the transverse dimension of a belt recess into which the coupling is inserted. Outlying erose sections formed by rough feathered edges extend from the periphery of each base portion. These sections bite firmly into the belt sections under tension thereby to connect the belt ends in a positive manner.

This invention has been disclosed in terms of certain embodiments It will be apparent that many modifications can be made to the disclosed apparatus without departing from the invention. Therefore, it is the intent of the appended claims to cover all such variations and modifications as come within the true spirit and scope of this invention.

What is claimed as new and desired to be secured by Letters Patent of the United States is:

1. An integral connector for joining recessed ends of a flexible belt of resilient material having end recesses thereby to form an endless belt assembly, said connector comprising an elongate central body portion having a given transverse dimension and gripping head portions at each end of said central body portion, each said gripping head portion being rigid and bounded by a tapered surface and by a base planar surface with a transverse dimension that exceeds the transverse dimension of the belt recesses and of said central body portion, said tapered and base planar surfaces extending toward an intersection about the periphery of said gripping head portion, each said gripping head portion further comprising a metal ring located proximate said intersection, a diverse material forming said elongate central body portion and portion of said gripping head portion that supports said metal ring, a roughened, feathered edge portion being formed integrally with and continuously about said metal ring at said intersection and being supported flexibly thereby for biting into the belt at the recessed ends thereof.

2. A connector for forming an endless belt as recited in claim 1 wherein said diverse material is a moldable material.

3. A connector for forming an endless belt as recited in claim 1 wherein said diverse material is a plastic material.

4. A connector for forming an endless belt as recited in claim 1 wherein said metal ring includes key means that engage said diverse material for locking said metal ring to said diverse material.

5. An endless belt assembly comprising:
A. flexible belt means of a resilient material having a finite length and being hollow at least at the ends thereof, and
B. an integral connector means including:
1 an elongate central body portion having a given transverse dimension, and
2 gripping head portions at each end of said elongate central body portion, each said gripping head portion being rigid and bounded by a tapered surface and a base planar surface with a transverse dimension that exceeds a transverse inner dimension of the hollow tubing portions and of said central body portion, said tapered and base planar surfaces extending outwardly toward an intersection and having an outlying roughened, feathered edge section flexibly supported continuously about the periphery of said base planar surface at said intersection, said connector means being inserted into the ends of said belt means thereby to form an endless belt, said outlying roughened, feathered edge sections biting into said belt means at the ends thereof when said belt means is placed in tension.

6. A connector for forming an endless belt as recited in claim 5 wherein a said gripping head portion has a conoidal shape.

7. A connector for forming an endless belt as recited in claim 6 wherein a said gripping portion has a conical shape.

8. A connector for forming an endless belt as recited in claim 5 wherein said connector is metal.

9. A connector for forming an endless belt as recited in claim 1 wherein a said gripping head portion comprises a metal ring and a diverse material formed as an extension of said elongate central body portion for supporting said metal ring, said intersection being located on said metal ring and said roughened, feathered edge portions being formed integrally with said metal ring and being flexibly supported thereby at said intersection.

10. A connector for forming an endless belt as recited in claim 9 wherein said diverse material is a moldable material.

11. A connector for forming an endless belt as recited in claim 9 wherein said diverse material is a plastic material.

12. A connector for forming an endless belt as recited in claim 9 wherein said metal ring includes key means that engage said diverse material for locking said metal ring to said diverse material.

* * * * *